No. 782,128. PATENTED FEB. 7, 1905.
C. B. HANEY.
WHEEL.
APPLICATION FILED AUG. 2, 1904.

WITNESSES:

INVENTOR
C. B. Haney,
By Victor J. Evans
Attorney

No. 782,128.

Patented February 7, 1905.

UNITED STATES PATENT OFFICE.

CHARLES B. HANEY, OF OLEX, OREGON.

WHEEL.

SPECIFICATION forming part of Letters Patent No. 782,128, dated February 7, 1905.

Application filed August 2, 1904. Serial No. 219,198.

*To all whom it may concern:*

Be it known that I, CHARLES B. HANEY, a citizen of the United States, residing at Olex, in the county of Gilliam and State of Oregon, have invented new and useful Improvements in Wheels, of which the following is a specification.

My invention relates to wheels, and more particularly to wheels for use upon wagons and other similar vehicles; and its object is to provide a wheel having a tubular metal felly formed of parts which are assembled in a novel manner and which have means whereby the spokes may be firmly secured thereto.

With the above and other objects in view the invention consists of a series of tubular sections having plugs within the ends thereof, said plugs serving to hold the sections together to form a continuous felly. Arranged within the sections at regular intervals are metallic thimbles having enlarged heads for the reception of ends of spokes.

The invention also consists of the further novel construction and combination of parts hereinafter more fully described, and pointed out in the claim.

In the accompanying drawings I have shown the preferred form of my invention.

Figure 1:
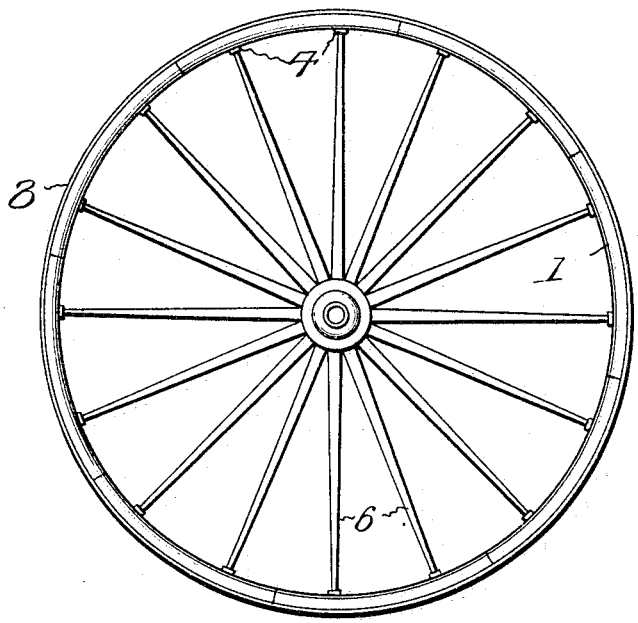
Figure 2:
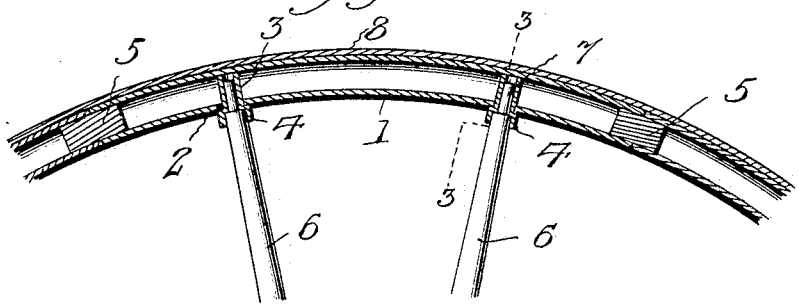
Figure 3:

In said drawings, Figure 1 is a side elevation of a wheel constructed in accordance with my invention. Fig. 2 is an enlarged longitudinal section through a portion thereof; and Fig. 3 is an enlarged section on line 3 3, Fig. 2.

Referring to the figures by numerals of reference, 1 is a tubular section curved to form an arc of a circle the center of which is the center of the wheel to be formed. This section has a flat tread, while the remainder thereof is curved and provided at intervals with apertures 2, in which are arranged thimbles 3, having enlarged heads 4. The inner ends of the thimbles 3 bear upon the inner face of the tread of the section, while the heads 4 bear on the outer face of the section at points around the apertures in which the thimbles are arranged.

A number of sections such as herein described are employed, and when they are assembled end to end they form a complete felly. The sections are held together by means of plugs 5, on which they are shrunk, and the thimbles 3 are also held within the openings 2 by having the sections shrunk thereon. Spokes 6 have their ends seated within the enlarged heads 4 of the thimbles, and stems 7 project from the ends of these spokes and into the thimbles. A tire 8, formed of a hoop of metal or other suitable material, is placed around the felly, as shown. This tire is held in place by being shrunk upon the felly.

A wheel constructed in accordance with my invention is extremely durable and is as neat in appearance as the ordinary wooden wheel.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

A vehicle-wheel, comprising a tubular felly having its inner wall perforated, a tubular thimble inserted through said perforation and bearing at its inner end upon the inner face of the outer wall of the felly, said thimble being provided with an enlarged tubular portion forming a shoulder to bear upon the outer face of the inner wall of the felly, and a spoke having its end seated in the enlarged portion of the thimble and provided with a reduced portion designed to enter the thimble.

In testimony whereof I affix my signature in presence of two witnesses.

CHARLES B. HANEY.

Witnesses:
W. L. TOBEY,
C. J. RICHARDSON.